(12) United States Patent
Kondratiuk et al.

(10) Patent No.: US 12,042,959 B2
(45) Date of Patent: Jul. 23, 2024

(54) METHOD FOR PRODUCING A POLYMER COATED METAL STRIP AND POLYMER COATED METAL STRIP PRODUCED THEREBY

(71) Applicant: TATA STEEL IJMUIDEN B.V., Velsen-Noord (NL)

(72) Inventors: Dmitry Kondratiuk, Haarlem (NL); Jan Paul Penning, 'S-Gravenhage (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 441 days.

(21) Appl. No.: 17/297,016

(22) PCT Filed: Dec. 17, 2019

(86) PCT No.: PCT/EP2019/085499
§ 371 (c)(1),
(2) Date: May 26, 2021

(87) PCT Pub. No.: WO2020/127159
PCT Pub. Date: Jun. 25, 2020

(65) Prior Publication Data
US 2022/0024083 A1    Jan. 27, 2022

(30) Foreign Application Priority Data
Dec. 21, 2018    (EP) ..................... 18215482

(51) Int. Cl.
*B29C 48/18*    (2019.01)
*B29C 39/10*    (2006.01)
(Continued)

(52) U.S. Cl.
CPC .............. *B29C 39/10* (2013.01); *B29C 39/38* (2013.01); *B29C 48/0018* (2019.02);
(Continued)

(58) Field of Classification Search
CPC ..... B29C 48/18; B29C 48/0018; B32B 15/08; B32B 37/15; B32B 37/20
See application file for complete search history.

(56) References Cited

U.S. PATENT DOCUMENTS 4,889,762 A    12/1989  Uchiyama et al.
5,182,141 A  *  1/1993  Borys .................. B32B 27/304
                                              156/244.11
(Continued)

FOREIGN PATENT DOCUMENTS

CN          1079197 A    12/1993
CN         87108200 A     8/1998
(Continued)

OTHER PUBLICATIONS

Purohit, Zalak, et al., "On surface damage of polymer coated sheet metals during forming". Journal of Manufacturing Processes 20 (2015) 389-396.*
(Continued)

*Primary Examiner* — Bret P Chen
(74) *Attorney, Agent, or Firm* — Vorys, Sater, Seymour and Pease LLP

(57) ABSTRACT

A method for producing a polymer coated metal strip in a continuous coating line, including the subsequent steps of:
  laminating a thermoplastic polymer film onto at least one side of a metal strip to produce a polymer coated metal strip;
  post-heating the polymer coated metal strip to temperature sufficiently high to melt the thermoplastic polymer film to reduce orientation and crystallinity of the thermoplastic polymer film to target value;
  cooling the post-heated polymer coated metal strip;
  in-line illuminating the laminated polymer film with near-infrared light having one or more or all wavenumbers between 3500 and 9000 cm$^{-1}$;
(Continued)

in-line acquiring back-scattered near-infrared light with a near-infrared spectroscopy detector;
calculating near-infrared spectrum from the back-scattered near-infrared light;
comparing the calculated near-infrared spectrum to a reference material near-infrared spectrum to determine Conformity Index as measure of the laminated polymer film degree of crystallinity and/or molecular orientation.

19 Claims, 4 Drawing Sheets

(51) Int. Cl.
| | | |
|---|---|---|
| *B29C 39/38* | (2006.01) | |
| *B29C 48/00* | (2019.01) | |
| *G01N 21/35* | (2014.01) | |
| *G01N 21/47* | (2006.01) | |
| *B29K 67/00* | (2006.01) | |
| *B29K 705/12* | (2006.01) | |

(52) U.S. Cl.
CPC ............ *B29C 48/18* (2019.02); *G01N 21/35* (2013.01); *G01N 21/47* (2013.01); *B29K 2067/003* (2013.01); *B29K 2705/12* (2013.01); *B29K 2995/0051* (2013.01); *B29K 2995/0053* (2013.01); *G01N 2021/4709* (2013.01)

(56) References Cited

U.S. PATENT DOCUMENTS

| | | | | |
|---|---|---|---|---|
| 5,238,517 | A * | 8/1993 | Heyes | B32B 37/203 |
| | | | | 156/244.11 |
| 5,407,702 | A * | 4/1995 | Smith | B05D 1/28 |
| | | | | 427/209 |
| 5,582,319 | A | 12/1996 | Heyes et al. | |
| 5,736,086 | A | 4/1998 | Jones et al. | |
| 5,919,517 | A * | 7/1999 | Levendusky | B05D 3/02 |
| | | | | 427/178 |
| 7,942,991 | B1 | 5/2011 | Loen et al. | |
| 9,346,254 | B2 * | 5/2016 | Penning | B32B 15/082 |
| 10,823,891 | B2 | 11/2020 | Machida et al. | |
| 2001/0009718 | A1 * | 7/2001 | Sinsel | B32B 37/153 |
| | | | | 156/244.11 |
| 2002/0124944 | A1 | 9/2002 | Beentjes | |
| 2003/0152788 | A1 * | 8/2003 | Velliky | B29C 48/919 |
| | | | | 428/457 |
| 2006/0243626 | A1 * | 11/2006 | Spaans | C08L 67/02 |
| | | | | 206/484 |
| 2007/0095241 | A1 * | 5/2007 | Rice | F42B 12/80 |
| | | | | 102/515 |
| 2008/0231793 | A1 * | 9/2008 | Futamura | G02B 5/3008 |
| | | | | 349/194 |
| 2011/0109200 | A1 * | 5/2011 | Jenninger | H10N 30/857 |
| | | | | 29/25.35 |
| 2013/0314788 | A1 * | 11/2013 | Chang | B29D 11/00788 |
| | | | | 264/1.9 |
| 2014/0072742 | A1 * | 3/2014 | Penning | B32B 38/0012 |
| | | | | 428/35.8 |
| 2016/0245971 | A1 * | 8/2016 | Chang | B29C 48/832 |
| 2017/0361579 | A1 * | 12/2017 | Chen | B32B 27/365 |
| 2018/0186948 | A1 | 7/2018 | Yajima et al. | |

FOREIGN PATENT DOCUMENTS

| | | | | | |
|---|---|---|---|---|---|
| CN | 104181121 | A | 12/2014 | | |
| CN | 105451993 | A | 3/2016 | | |
| CN | 107709422 | A | 2/2018 | | |
| CN | 108883606 | A | 11/2018 | | |
| CN | 108884375 | A | 11/2018 | | |
| DE | 69029071 | T2 | 3/1997 | | |
| EP | 0415345 | A2 | 3/1991 | | |
| EP | 1019248 | A1 | 7/2000 | | |
| EP | 1690675 | A1 | 8/2006 | | |
| EP | 3121864 | A1 | 1/2017 | | |
| EP | 3011080 | B1 | 7/2017 | | |
| WO | WO 91/12134 | | * | 8/1991 | ............ B32B 31/00 |
| WO | 9839160 | A1 | 9/1998 | | |
| WO | WO 2012/146654 | A1 | * | 11/2012 | ............ B23B 15/04 |
| WO | 2017/174345 | A1 | 10/2017 | | |
| WO | WO 2017/174345 | A1 | * | 10/2017 | ............ B32B 15/08 |

OTHER PUBLICATIONS

Ullah, Asad, et al., "Porous polymer coatings on metal microneedles for enhanced drug delivery". Royal Society Open Science 5: 171609, pp. 1-11.*

Selles, M.A., et al., "Modelization of Three-layered Polymer Coated Steel-strip Ironing Process Using a Neural Network". The 4th Manufacturing Engineering Society International Conference (MESIC 2011) AIP Conf. Proc. 1431, 733-739 (2012).*

Translation of Mar. 2, 2023 Office action translation for Chinese application No. 201980084100.8.

International Search Report and Written Opinion mailed Feb. 21, 2020 for PCT/EP2019/085499 to Tata Steel Ijmuiden B.V. filed Dec. 17, 2019.

* cited by examiner

METHOD FOR PRODUCING A POLYMER COATED METAL STRIP AND POLYMER COATED METAL STRIP PRODUCED THEREBY

CROSS-REFERENCE TO RELATED APPLICATIONS

This is a § 371 National Stage Application of International Application No. PCT/EP2019/085499 filed on Dec. 17, 2019, claiming the priority of European Patent Application No. 18215482.3 filed on Dec. 21, 2018.

FIELD OF THE INVENTION

This invention relates to a method for producing a polymer coated metal strip in a continuous coating line and to a polymer coated metal strip produced thereby.

BACKGROUND OF THE INVENTION

Lamination involves the application, to one or both sides of a metal substrate, of a thermoplastic polymer film such as polypropylene (PP) and polyethylene terephthalate (PET). Adhesion to the substrate can be achieved with or without a separate adhesive layer. A polymer film may comprise different constituent polymer layers. Either identical or different film types can be laminated to both sides of the metal substrate. The film can be provided as a coiled film such as in U.S. Pat. No. 7,942,991 or it can be produced immediately prior to lamination in the so-called cast-film lamination process such as in EP1019248-A1.

The film lamination typically involves:
1. providing a metal substrate to be coated, usually as a coiled metal strip
2. preheating the substrate
3. providing the polymer film or films for single or double-sided lamination
4. re-heating of the laminated substrate ('post-heat')
5. water quenching, drying and coiling the laminated metal substrate.

The cast film-lamination typically involves:
1. providing a metal substrate to be coated, usually as a coiled metal strip
2. preheating the substrate
3. casting a polymer film and laminating it onto one side of the substrate, optionally simultaneously or subsequently casting a second polymer film and laminating it on the other side of the substrate
4. re-heating of the laminated substrate ('post-heat')
5. water quenching, drying and coiling the laminated metal substrate.

In all these process routes for producing polymer coated steel, the post-heat step plays an essential role. As shown above the post-heat step takes place after the coating has been applied to the metal substrate. The post-heat step aims to melt the polymer coating. Proper melting results in an intimate contact between polymer and metal substrate and removes any residual crystallinity and molecular orientation from the coating. This results in high adhesion, formability, corrosion resistance and good visual appearance of the polymer coated end product.

The common method of measuring the post-heat temperature with a pyrometer is not without problems. Firstly, the temperature is measured by looking at the polymer surface. The transmittance of a plastic varies with the wavelength and is proportional to its thickness. Thin materials are more transmissive than thick plastics. Since the intention of the post heating is to melt the polymer layer, measuring the surface temperature only may potentially provide inaccurate information as to the molten state of the entire polymer layer. Also, the post-heat temperature measurement is often performed at a certain distance after the furnace so that the measured temperature is not the actual post-heat temperature in the furnace. Beside the issues with the transmissivity of the film, there is also the emissivity of the film that is often not as accurately known as one would want. The emission coefficient is an important parameter in translating a measured pyrometer signal into a temperature reading. This combination of factors makes the post-heat temperature measurement less suitable as a characterisation method for the degree of crystallinity and orientation of the laminated polymer film, and may result in a post-heating temperature that is actually higher than necessary, which is potentially less energy efficient as it could be, or may result in a post-heating temperature that is actually lower than necessary. This may lead to no melting or insufficient melting of the polymer coating resulting in adhesion problems between polymer and metal substrate and residual crystallinity and molecular orientation in the coating.

To verify whether proper post-heat conditions were applied during the production of polymer coated steels, the common procedure is to check crystallinity (and in some cases also orientation) of the coating in the finished product on free standing coating films by means of differential scanning calorimetry, which are obtained after dissolution of the steel base in hydrochloric acid. Although the approach gives reliable values of crystallinity, it is very time-consuming (several days or even weeks) and implies significant efforts into sample preparation that cannot be implemented in the production lines.

Objectives of the Invention

It is therefore an object of this invention to provide a method for producing a polymer coated metal strip in a continuous coating line that allows faster determination of the degree of crystallinity and/or orientation.

It is also an object of this invention to provide a method for producing a polymer coated metal strip in a continuous coating line that allows determination of the degree of crystallinity and/or orientation in-line.

It is also an object of this invention to provide a more efficient method for producing a polymer coated metal strip in a continuous coating line.

DESCRIPTION OF THE INVENTION

One or more of the objects are reached with the method for producing a polymer coated metal strip in a continuous coating line, the method comprising the subsequent steps of:
  providing a metal strip;
  providing a thermoplastic polymer film for coating onto at least one side of the metal strip;
  laminating the thermoplastic polymer film onto the metal strip to produce a polymer coated metal strip;
  post-heating the polymer coated metal strip to a temperature sufficiently high to melt the thermoplastic polymer film in order to reduce the orientation and crystallinity of the thermoplastic polymer film to the target value;
  cooling, preferably fast cooling, the post-heated polymer coated metal strip;

in-line illuminating the laminated polymer film with near-infrared light having one or more or all wavenumbers between 3500 and 9000 cm$^{-1}$;

in-line acquiring back-scattered near-infrared light with a near-infrared spectroscopy detector;

calculating a near-infrared spectrum from the back-scattered near-infrared light;

comparing the calculated near-infrared spectrum to a near-infrared spectrum of a reference material to determine a Conformity Index as a measure of the degree of crystallinity and/or the molecular orientation of the laminated polymer film.

Preferred embodiments are provided in the dependent claims.

In the method according to the invention a metal strip is provided on at least one side with a polymer film and post-heated to melt the polymer coating. After quenching of the polymer coated metal strip, the strip is led in-line past a near-infrared (NIR) emission device that illuminates the polymer film with near infrared light having one or more or all wavenumbers between 3500 and 9000 cm$^{-1}$. The one or more or all wavenumbers may be a full NIR-spectrum (all wavenumbers) having wavenumbers between 3500 and 9000 cm$^{-1}$, or one or more selected wavenumbers in this range.

To collect meaningful NIR-data may any residual water of the quenching operation must be removed, e.g. by drying or wiping (e.g. by using drying rollers), from the polymer coated metal strip because water is a strong NIR absorbent. The back-scattered NIR-light spectrum is subsequently acquired by a NIR-spectroscopy detector and passed to an analyser/computer to derive an index that is indicative for the degree of crystallinity and/or molecular orientation. This index, the Conformity Index (CI), is derived on the basis of the back-scattered NIR-light, and in order to make this analysis sufficiently fast it is preferable to use Fourier transformation technology or any other suitable transformation technology or algorithm to calculate the real-time NIR-spectra from the acquired back-scattered NIR-light. If only back-scattered NIR-light of one or a limited number of selected wavenumbers is acquired, and not the entire NIR-spectrum, then the analysis of the acquired back-scattered NIR-light can be somewhat simplified. It should be noted that if a full back-scattered spectrum is used that the resolution during detection is a finite value to limit the number of datapoints acquired. So the back-scattered NIR-spectrum contains a finite number of data points. In the examples given herein below a resolution of 16 cm$^{-1}$ was used.

The method according to the invention can be performed when producing a polymer coated strip that is coated on one side only, but it can also be performed when producing a polymer coated strip that is coated on both sides by installing emission heads and detectors on either side of the strip. The thermoplastic polymer films on both sides may even differ.

The method according to the invention can be performed in-line. In the context of this invention "in-line" is to be understood as constituting an integral part of a continuous sequence of operations. This is contrary to the off-line method of determining a degree of crystallinity by means of (e.g.) differential scanning calorimetry, which can only be done after the completion of the polymer coated strip because samples need to be physically obtained and processed.

Consequently, due to the ability to have a fast indication of the degree of crystallinity and/or molecular orientation the method according to the invention allows the operators to intervene and adjust the post-heat parameters during the production process. This can be done, for example, by adjusting the process settings of the post-heat device, which is often an induction type device which is able to respond to these adjusted settings quickly, or by changing the line speed of the continuous coating line. By defining a CI threshold value that allows the operators or the process automation to distinguish a 'good' product from a 'bad' product the process conditions can be adapted immediately.

Measuring the crystallinity by NIR is therefore a more efficient and more reliable method to control the quality of the lamination process compared to using a pyrometer that measures the temperature of the polymer coated metal substrate. This is because the temperature at the point measured by pyrometer can be significantly different compared to the temperature necessary for an effective post-heat. The distance between the post-heat and the temperature measurement causes a difference. Also, since the emissivity of the polymer film is not precisely known, measuring the temperature with a pyrometer is inherently inaccurate. Hence, controlling the product property directly by NIR is much more reliable than controlling the product property indirectly through a process setting.

The conformity test entails checking for deviations of measured NIR spectra within certain limits for test samples at selected wavelengths in the NIR-spectrum. Samples of the desired final product ("reference sample") are needed as a reference which show variations within the accepted range of specifications to set these limits. The measured NIR-spectra of these reference samples will reflect the acceptable variations. A variation of NIR-spectra of a test sample has to fit in these limits on each wavelength to pass the 'good'-'bad'-test.

For the reference spectra, the average absorbance of NIR-light and the standard deviation σ of the absorbance values for each selected wavelength are calculated. The mean value plus/minus the standard deviation determine the confidence band in the spectral range.

To determine whether or not a test sample is within the accepted band, the difference between the average absorbance (A) of the NIR-light by the polymer film between the test sample and the reference sample is calculated at each selected wavelength. This absolute deviation is subsequently divided by the corresponding standard deviation at the respective wavelength, which results in a relative deviation referred to as Conformity Index (CI).

$$CI_i = \frac{A_{reference,i} - A_{sample,i}}{\sigma_{reference,i}}$$

The maximum of all $CI_i$ values is subsequently used as CI value for the test sample.

The CI allows distinguishing a 'good' product from a 'bad' product. The threshold value is determined by comparing NIR-spectra from 'good' products with 'bad' products. To determine whether or not a product was classified 'good' or 'bad', the off-line measurements of coils of polymer coated metal strip were used. The NIR-spectra of these same materials was also determined, and therefore the inventors were able to determine the NIR-spectrum of a perfect product. The perfect product by definition has a CI-value of 0.

On the basis of the off-line tests the inventors could determine that a sample having a CI of below 0.50 can be qualified as 'good', and samples above 0.50 as 'bad' if the purpose of the process is to have as low a degree of crystallinity and/or molecular orientation as possible. For very critical applications a lower threshold value than 0.50 for the threshold value can be chosen, such as 0.40, 0.30 or even 0.25.

If the CI falls outside the accepted band, e.g. above 0.5 or any other appropriate threshold value (as indicated herein above), one or more of the process parameters in the continuous coating line such as the post-heat set-point temperature or the line speed can be adjusted to bring the CI down into the accepted band for the remainder of the current polymer coated metal strip and for any successive polymer coated metal strip According to the invention the usable NIR-spectrum lies between a wavenumber of 3500 and 9000 cm$^{-1}$. The wavenumber, as used in spectroscopy and most chemistry fields, is defined as the number of wavelengths per unit distance, typically centimetres (cm$^{-1}$):

$$\tilde{v} = \frac{1}{\lambda},$$

The NIR-spectrum is a continuous spectrum, and the accuracy of the determination is improved if as many relevant wavenumbers are sampled as possible. The inventors found that the biggest difference in the NIR-spectra between a good and a bad sample could be found between 3750 and 6000 cm$^{-1}$. Especially for PET-based polymers a suitable range was found to be 4100-4500 cm$^{-1}$, but this range is also suitable for other thermoplastic polyesters and polyolefines.

It should be noted that the method according to the invention is described hereinabove to work by illuminating the polymer film with a NIR-light spectrum with wavenumbers between 3500 and 9000 cm$^{-1}$, or the abovementioned more limited range of wavenumbers. However, as the acquisition of the back-scattered NIR-light is the most time consuming part of the procedure, the inventors have also noted that in principle the method could be performed by illuminating with one or more monochromatic NIR-light beams or by selecting one or more monochromatic back-scattered NIR-light beams, or by a combination thereof. Provided the wavenumbers are selected so as to allow distinction between a 'good' and a 'bad' sample, the reduction of the amount of beams from a full spectrum to one or more monochromatic back-scattered NIR-light beams reduces the acquisition time of the back-scattered NIR-light, thereby allowing to adjust the process parameters of (e.g.) the post-heat more quickly. By means of example, in FIG. 2, a wavenumber of 4406 cm$^{-1}$ shows a large difference between the 'good' reference sample and the 'bad' test sample.

In an embodiment of the invention a plurality of emission heads and detectors can be installed over the width of the strip to determine the homogeneity of the product over the width as well as over the length. For the same purpose a single scanning emission head and detector could be used.

The method according to the invention is not particularly limited to a certain type of metal strip. The metal strip may be an aluminium or aluminium alloy strip, or a steel strip.

In the process according to the invention it is preferable that the aluminium or aluminium alloy strip is of the 3000 or 5000 series. Examples thereof are given in table 1.

TABLE 1

Composition of some aluminium alloys used in metal packaging (Canmaking, T. A. Turner, p. 12).

| Alloy type | Added % (range)$^a$ | | Added % (max.)$^a$ | | | | | |
|---|---|---|---|---|---|---|---|---|
| | Mn | Mg | Si | Fe | Cu | Cr | Zn | Ti |
| 3004 | 1.0-1.5 | 0.8-1.3 | 0.3 | 0.7 | 0.25 | — | 0.25 | — |
| 5182 | 0.2-0.5 | 4.0-5.0 | 0.2 | 0.35 | 0.06 | 0.1 | 0.25 | 0.1 |
| 5052 | 0.1 (max.) | 2.2-2.8 | 0.45 | 0.45 | 0.1 | 0.15-0.35 | 0.1 | — |
| 5042 | 0.2-0.5 | 3.0-4.0 | 0.2 | 0.35 | 0.15 | 0.1 | 0.25 | 0.1 |
| 5082 | 0.15 | 4.0-5.0 | 0.2 | 0.35 | 0.15 | 0.15 | 0.25 | 0.1 |

$^a$ Unless indicated otherwise, other ingredients up to 0.05% per element total ~0.15%.

The steel strip can be uncoated blackplate or a metallic-coated strip such as tinplate or galvanised steel, and may contain a conversion layer or passivation layer to enhance the product performance and/or promote adhesion between the metal and the polymer film. This conversion layer or passivation layer can e.g. be based on chromium oxide, chromium/chromium oxide, titanium oxide, zirconium oxide, phosphates. In an embodiment the strip consists of tinplate, blackplate or tin-free steel (conventional ECCS or the new TCCT® as in EP3011080-B1). The strips may be subjected to a heat treatment for instance for reflowing the tin, for allowing the tin to diffuse into the steel strip and form various types of FeSn-alloys. The heat treatment may be applied before or after the application of the polymer film.

In the process according to the invention a cold-rolled steel low-carbon, extra-low-carbon or ultra-low-carbon strip for producing packaging steel is provided. Low carbon steels typically have a carbon content of up to about 0.15 wt. % C (but for packaging purposes is normally up to about 0.08 or even 0.05 wt. % (see e.g. EN10202:2001 E or ASTM A623), extra-low carbon steels typically have a carbon content of up to about 0.02 wt. % C and ultra-low carbon steels typically have a carbon content of up to about 0.005 wt. % C.

In an embodiment an adhesion layer for promoting the adhesion between the metal strip and the polymer film is provided.

The method according to the invention is not particularly limited to a certain type of polymer film to be coated onto the metal strip.

In an embodiment the thermoplastic polymer film is a polymer coating system comprising at least one layer of thermoplastic resins such as polyesters or polyolefins, and functionalised polymers, and/or copolymers thereof and/or blends thereof. For clarification:

Polyester is a polymer composed of dicarboxylic acid and glycol. Examples of suitable dicarboxylic acids include terephthalic acid, isophthalic acid and naphthalene dicarboxylic acid. Examples of suitable glycols include ethylene glycol, propane diol, butane diol, hexane diol, cyclohexane diol, cyclohexane dimethanol, neopentyl glycol etc. More than two kinds of dicarboxylic acid or glycol may be used together.

Polyolefins include for example polymers or copolymers of ethylene, propylene, 1-butene, 1-pentene, 1-hexene or 1-octene.

Functionalised polymers for instance by maleic anhydride grafting, include for example modified polyethylenes, modified polypropylenes, modified ethylene acrylate copolymers and modified ethylene vinyl acetates.

Mixtures of two or more resins can be used. Further, the resin may be mixed with anti-oxidant, heat stabiliser, UV absorbent, plasticiser, pigment, nucleating agent, antistatic agent, release agent, anti-blocking agent, etc. The use of such thermoplastic polymer coating systems have shown to provide excellent performance in can-making and use of the can, such as shelf-life.

Preferably the polymer coating system i). comprises more than one layer of thermoplastic resins such as polyesters or polyolefins, and functionalised polymers, and/or copolymers thereof and/or blends thereof, or ii). consists entirely of a layer or layers of thermoplastic resins such as polyesters or polyolefins, and functionalised polymers, and/or copolymers thereof and/or blends thereof.

Typical melting temperatures of certain thermoplastic polymers are 250-260° C. for PET, 223° C. for PBT, 110 to 130° C. for PE, 130-170° C. for PP. The melting temperature is strongly influenced by factors such as (but not limited to) copolymerisation and the type of copolymer, transesterification in case of blends. The melting temperature of a polymer can be determined by DSC (see below).

A preferred embodiment of the invention is the method according to the invention wherein the thermoplastic polymer film, consisting of one or more layers, is produced by:
  melting thermoplastic polymer granules in one or more extruders to form the one or more layers;
  forming the thermoplastic polymer film consisting of the two or more layers by passing the molten polymer or polymers through a flat (co-)extrusion die and/or two or more calendering rolls;
  optionally followed by:
  cooling the thermoplastic polymer film to form a solid thermoplastic polymer film;
  trimming the edges of the thermoplastic polymer film;
  reducing the thickness of the solid thermoplastic polymer film by stretching the solid polymer film in a stretching unit by exerting a stretching force only in the longitudinal direction;
  optionally trimming the edges of the stretched thermoplastic polymer film.

This method is followed by laminating the stretched polymer film immediately, or with an intermediate coiling and uncoiling operation of the stretched polymer film. The optional steps of cooling the polymer film to form a solid thermoplastic polymer film, trimming, stretching and optional trimming of the stretched film are not applicable for the cast-film lamination process in which the film after casting is optionally stretched in its molten state, optionally followed by edge-trimming, and subsequently laminated onto the metal strip.

The polymer thermoplastic granules are chosen such so as to produce the desired layer (see e.g. the example in Table 2).

In an embodiment the polymer film or films in the method according to the invention is a biaxially oriented film. During the post-heat any orientation and crystallinity will be removed, verifiable by the in-line NIR technology according to the invention.

In an embodiment the polymer film or films in the method according to the invention is a uniaxially oriented film. During the post-heat any orientation and crystallinity will be removed, verifiable by the in-line NIR technology according to the invention.

Preferably the polymer film has a bulk crystallinity value as measured by DSC in accordance with the method in the description of at most 10 wt. %, preferably at most 8, 6 or even at most 5%. The lower the crystallinity, the better the adhesion between thermoplastic polymer film and the metal substrate is.

In an embodiment the polymer film or films in the method according to the invention is a cast film. These films generally are non-crystalline after casting, but any residual crystallinity or orientation will be removed during the post-heat, verifiable by the in-line NIR technology according to the invention The method according to the invention can be used in any continuous coating line where a metal strip is coated with one or more polymer films. The method according to the invention is particularly suitable for continuous coating lines operating at a line speed of at least 80 m/min, preferably at least 100 m/min, more preferably 120, 150, 200 or even 300 m/m. The speed of the assessment of the degree of crystallinity and/or the molecular orientation of the laminated polymer film is sufficiently high to allow these kinds of line speeds. The higher the line speed, the higher the productivity of the line.

According to a second aspect the invention is also embodied in a polymer coated metal strip produced according to any one of the preceding claims, wherein the polymer film has a conformity index CI of below 0.5 as determined with infra-red light having a wavenumber of between 4100 and 4500 $cm^1$. Preferably the polymer film has a bulk crystallinity value as measured by DSC in accordance with the method in the description of at most 10 wt. %, preferably at most 8, 6 or even at most 5%. The crystallinity is determined according to ISO 11357-3-1999 "Plastics—Differential scanning calorimetry (DSC)—Part 3: Determination of temperature and enthalpy of melting and crystallization" with a heating rate of 10° C./min.

BRIEF DESCRIPTION OF THE DRAWINGS

The invention will now be further explained by means of the following, non-limiting examples and figures. Note that the dashed and dotted lines connecting the data points in FIGS. 3, 4 and 5 are intended as guide-to-the-eye only.

EXAMPLES

In all samples, a metal strip is laminated on both sides with a thermoplastic polymer film.

The metal strip is Electrolytically Chromium Coated Steel ("ECCS"), which is a cold rolled steel strip, electrolytically coated on both sides with metallic chromium and a layer of chromium oxide where a total amount of chromium on each side is approximately 90 mg/m2 and a chromium oxide layer containing 7 to 10 $mg/m^2$ as chromium.

The detector facing side of the strip is coated with a 20 µm uniaxially stretched (MDO) three layer film consisting of an adhesion layer, a bulk layer and a top layer.

TABLE 2

Three layer film.

| Adhesion layer | Main layer | Top layer |
|---|---|---|
| 70% PETg + 30% IPA-PET* | 100% IPA-PET* | 100% IPA-PET* |

Figure 1:
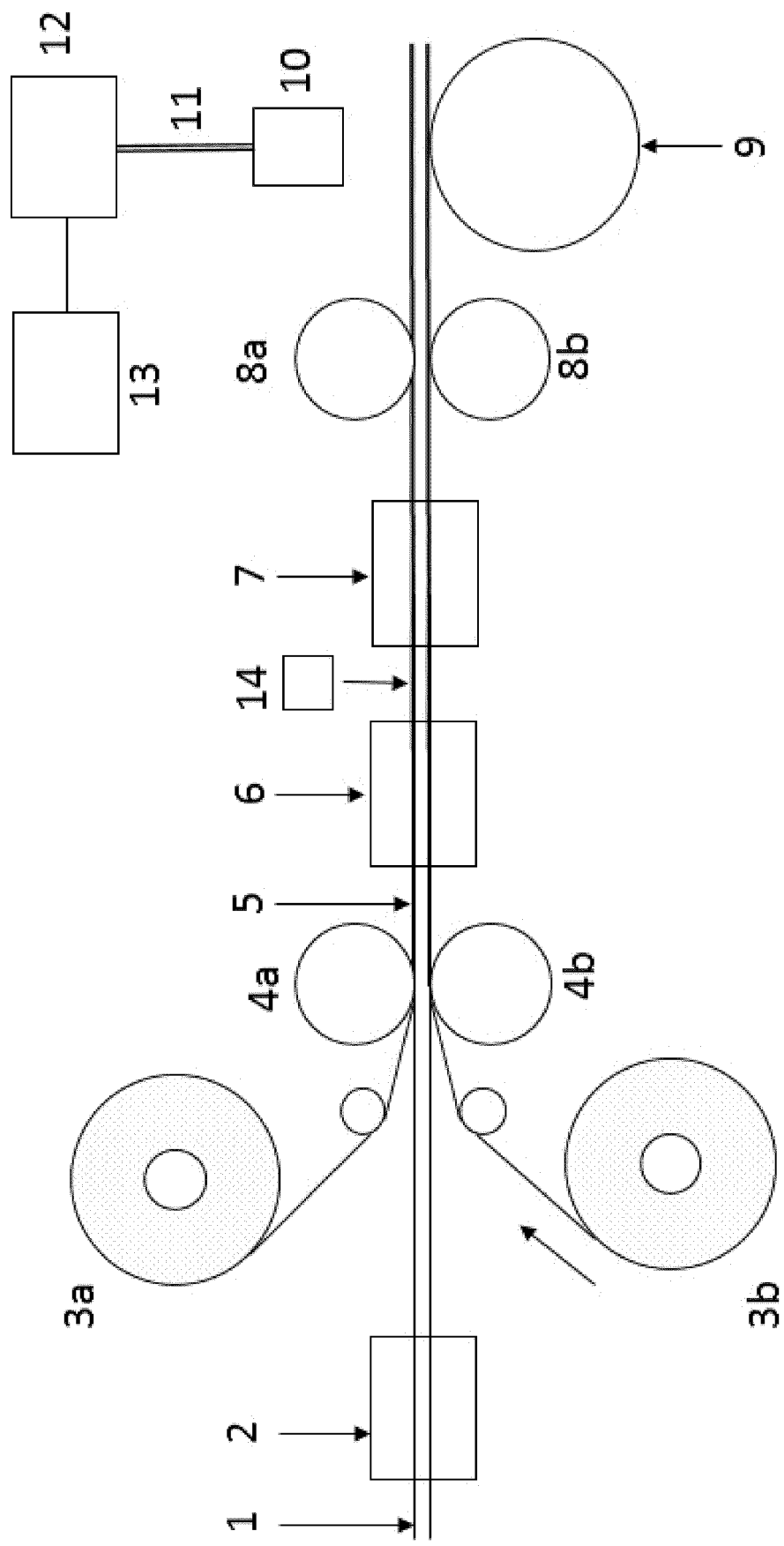
FIG. 1 shows a schematic drawing of an industrial continuous coating line.

IPA-PET is a polyethyleneterephthalate copolymer in which about 2-3 mole % of terephthalic acid monomer units has been replaced with isophthalic acid monomer units The PET1 film from table 2 is laminated to the ECCS strip by a process schematically shown in FIG. 1. The metal strip (1) is passed through first heating device (2) where temperature of the metal strip is raised to pre-heat temperature suitable for lamination, T1. In the present examples T1 was chosen to be 200° C. suitable for lamination of PET to a metal strip. A coil of film PET1 (3a) and PET2 (3b) are simultaneously unwound and passed, together with the pre-heated metal strip, through a pair of laminating rollers (4a, 4b). In the present examples, in all cases line speed was 50 m/min. The laminated product (5) is passed through a second heating device (6) where the temperature of the laminated strip is raised to a post-heat set-point, T2. After the second heating device, the laminated product is immediately cooled by passing through a quenching device (7) to reach room temperature. The method of pre-heating the metal strip in the first heating device is not particularly limited and may include passing the strip over heated rolls, conductive heating, inductive heating, radiative heating, etc. The method of post-heating the laminated product in the second heating device is preferably a contactless method, such as heating in a hot gas environment or inductive heating. The method of immediate cooling in the quenching device is not particularly limited and may include applying cold air or passing through a cold water bath etc. The laminated product is then passed through drying rollers (8a, 8b) to an anti-vibration roller (9) followed by irradiation and acquisition of diffuse reflected near-infrared light using contactless detector (10). The collected near-infrared light is then passed by optical cable (11) to analyser (12). The data of the analyser is then passed on to computer (13) for calculating in real-time, using Fourier transformation, the near-infrared spectra, and determining the conformity index. A pyrometer (14) is positioned after the post-heating device (6). The temperature of the laminate is measured. Due to the unknown degree of transmissivity of the polymer and the emission coefficient, and the distance between heating and measuring, the reading provided by the pyrometer is not accurate enough. This inaccuracy is the major reason why the method according to the invention is such an improvement. The value of the CI can be used as a quality indicator for the product, e.g. as input for decisions to reject or approve a produced polymer coated metal strip, or as input for in-line adjustment of the relevant process parameters, such as post-heat set-point (T2), to immediately improve the product quality in-line and prevent production of rejects or inferior quality products.

In order to demonstrate the present invention, several metal-polymer laminate samples were produced with different post-heat temperature set points. During production of the samples, in-line NIR-data were collected and the value of CI was derived for each production setting. Based on the obtained value of CI, the metal laminate material was classified as good or bad quality as explained above. The results of classification obtained in-line were then compared with the results of analyses performed off-line by DSC and product performance testing. In case of DSC, the analysis was on a sample of metal-polymer laminate cut out at the point illuminated by the NIR-detector so as to enable a direct comparison.

Figure 2:
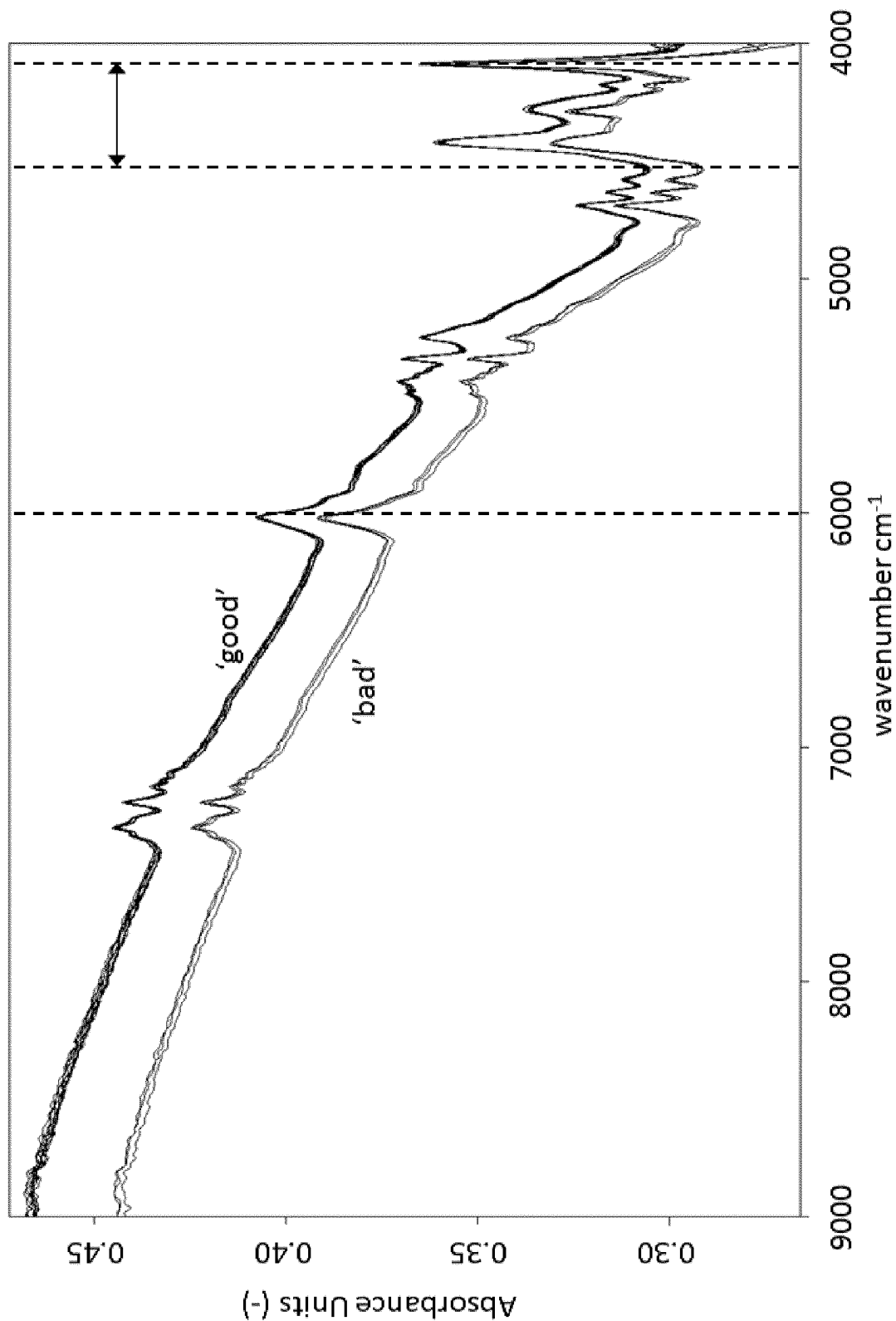
FIG. 2 shows an in-line measured NIR spectrum of a 'good' sample (upper set of measurements) and a 'bad' sample (lower set of measurements) for a strip laminated with the same PET-film with different post-heat set-points.
Figure 3:
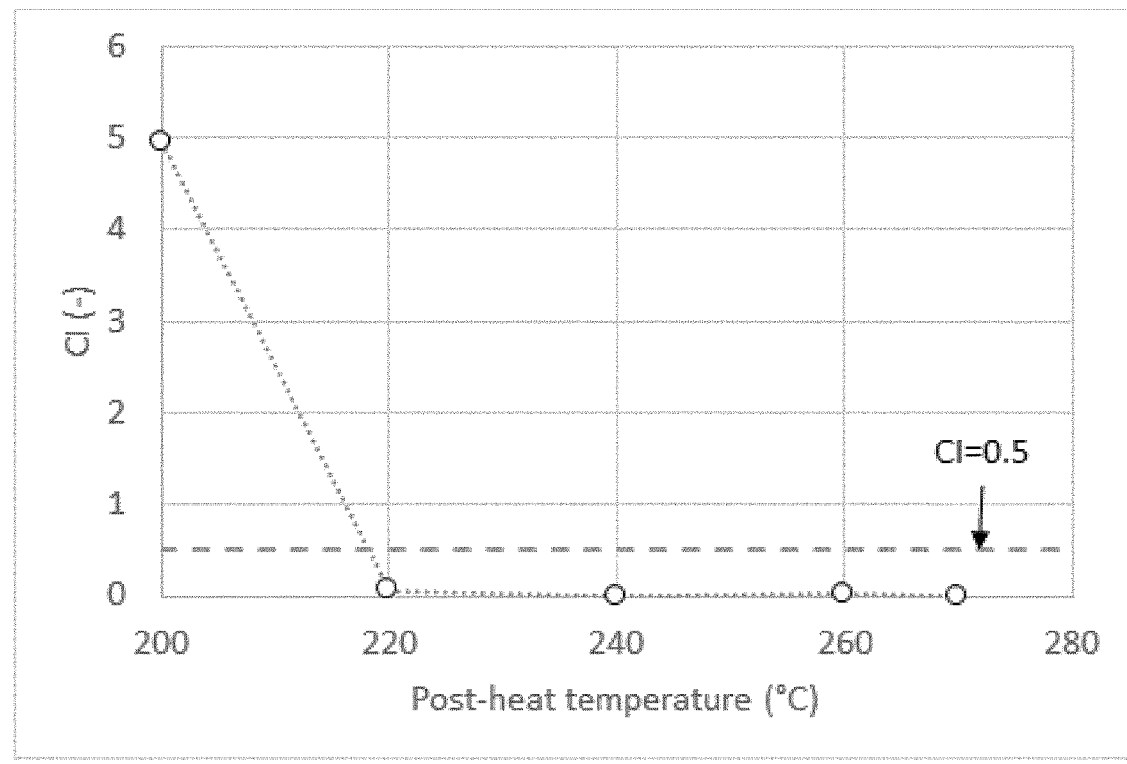
FIG. 3 shows the results of the conformity index on the basis of spectra in FIG. 2. The threshold CI-value 'good' vs. 'bad' of 0.5 is indicated with the dashed horizontal line. The x-axis shows the reading of the post-heat set-point.

In-line NIR-data was collected by use of a Bruker Matrix-F and a Bruker Q412/A NIR sensor head with a resolution in wavenumber of 16 cm$^{-1}$ and 32 scans. The total scan time per spectrum was roughly 20 seconds. For the example the scans were made between the wavenumber 4000 to 9000 cm$^{-1}$. The range of 4100 to 4500 cm$^{-1}$ of the NIR-spectrum was used to perform the conformity test because in this range the changes of the NIR-spectrum during post heat treatment are most significant as shown in FIG. 2. As the result of the test the maximum of all CI-values at each wavelength is derived. These analyses have shown that samples with a CI over a threshold of 0.5 can be classified as 'bad' quality and samples with a CI under a threshold of 0.5 can be classified as 'good' quality (FIG. 3). The lower the CI, the better the quality when considering the degree of crystallinity and/or molecular orientation. That is why in an embodiment of the invention, the CI threshold can also be chosen lower than 0.5, e.g. 0.4, 0.3 or even 0.25. FIG. 3 clearly shows that the method according to the invention allows for a determination of quality because the CI increases steeply between a post-heat temperature set point of 220 and 200° C. The data in Table 4 show the clear correlation between CI and the weight percentage of crystallinity. The molecular orientation, or the absence thereof, can easily be determined by removing the metal substrate from the polymer coating, e.g. by dissolving the metal substrate, and subjecting the polymer coating to a tensile test. The degree of molecular orientation can be estimated by comparing the mechanical properties obtained in the tensile test for longitudinal and transverse (i.e. perpendicular) samples. The mechanical properties of the films were determined using an Instron 5587 tensile tester equipped with pneumatic grips, operated at 40 mm sample gauge length and a cross-head speed of 10 mm/min. Film samples of 10 mm in width and about 80 mm in length were cut from the films using a surgical knife. Film thickness was determined from the weight of a film sample of known length and width, assuming a density of 1380 kg/m3.

Off-line characterisation data for the reference sample (which has the desired very low crystallinity) and the test samples are summarised in Table 4. The table also contains average conformity test results derived from near infra-red data collected in-line for these samples.

As can be seen from off-line characterisation data for the reference sample, post-heating a metal-laminate at a post-heat set point for T2 of 270° C. results in fully melted and amorphous PET coatings on both coated sides. This is evidenced by the low crystallinity values derived by DSC. The performance of these coating sides during the adhesion and sterilisation test is excellent.

Thermal properties ($T_g$, $T_m$, bulk crystallinity) of the polymer coating were determined by DSC. The spectra were recorded using a Mettler Toledo DSC821e calorimeter operated at 10° C./min heating rate. For DSC, it was necessary to analyse the free-standing films obtained from the metal-laminates. Samples of metal-polymer laminate were cut out at the point illuminated by the NIR-detector. Free-standing coating films were obtained by placing a sample of metal-laminate from the line in 18% hydrochloric acid in water to dissolve the metal substrate. After dissolution of the metal substrate, the coating films were thoroughly rinsed and dried. The crystalline fraction was determined from the heat of recrystallization and the heat melting recorded during the first heating run. Bulk crystallinity values were calculated from $$X = \frac{|\Delta H_m| - |\Delta H_r|}{\Delta H_0} \times 100\%$$

where $\Delta H_r$ is the observed area of recrystallization peak and $\Delta H_m$ is the observed area of melting peak, and $\Delta H_0$ is an enthalpy of fusion for 100% crystalline PET assumed to be 115.0 J/g (J. Brandrup, E. H. Immergut, E. A. Grulke et al, Polymer Handbook, Wiley Interscience, 4$^{th}$ ed (1999), Section VI, Table 7).

Sufficiently melted PET coating in metal-polymer laminate has a crystallinity value which is lower than 10%.

Test samples 1 through 4 show a pronounced dependence of their thermal, optical and sterilisation performance properties on post-heat set-point. As can be seen from Table 4, post-heating at a set point for T2 of 200° C. results in semi-crystalline PET coating as follows from crystallinity values derived by DSC. With increasing post-temperature T2 above 200° C., the value of crystallinity on both coating sides drops to lower than 10% and close to that of well post-heated Comparative sample. The most dramatic change in the value of crystallinity occurs upon increasing T2 to 220° C., after which further increase of T2 does not significantly affect the values of crystallinity.

Further, similar dependence on temperature is observed when following performance of the samples during adhesion and sterilisation tests. For this test, panels of 15×7.5 cm were cut from the flat polymer coated steel sheet. The panels were then placed in an aqueous solution containing 12 g/l Maggi+2 g/l plasmal in a closed container and subsequently sterilised at 121° C. during 90 min. After sterilisation and cooling of the samples, a 4×5 mm cross-hatch is applied to the flat portion of the panel followed by adhesive tape method as described in ISO 2409:1992, 2nd edition. After that, delamination is evaluated using the Gitterschnitt scale ranging from 0 (excellent) to 5 (bad) (see Table 3).

TABLE 3

Classification of Gitterschnitt results

| Score | Cross-cut area affected, % | Description |
|---|---|---|
| 0 | 0 | The edges of the cuts are completely smooth; none of the squares of the lattice is detached |
| 1 | <5% | Detachment of small flakes of the coating at the intersections of the cuts. |
| 2 | <15% | The coating has flaked along the edges and/or at the intersections of the cuts. |
| 3 | <35% | The coating has flaked along the edges of the cuts party or wholly in large ribbons, and/or it has flaked party or wholly on different parts of the squares. |
| 4 | <65% | The coating has flaked along the edges of the cuts in large ribbons and/or some squares have detached party or wholly. |
| 5 | — | Any degree of flaking that cannot be classified by Rank 4 |

All tests were performed in triplo, averaged and rounded to the nearest whole number.

As seen in Table 4, the adhesion and sterilisation performance of not fully melted Test sample 1 (T2=200° C.) during the Gitterschnitt test is poor with 15-35% cross-cut area affected. The Gitterschnitt test data on Test samples 1 and 2 are consistent with the development of crystallinity and orientation in the PET coating for these samples described above. In contrast, performance of Test sample 3 (T2=240° C.) and Test sample 4 (T2=260° C.) during Gitterschnitt test is excellent, identical to that of reference sample and is consistent with fully melted and amorphous PET coating confirmed by DSC.

During production of Test samples 1 through 4, for each T2 value, 3 near infra-red spectra were acquired in-line. Based on the near infra-red data, the corresponding CI was derived for each production setting (FIG. 3).

In conclusion, in-line near infra-red measurement proves a suitable accessory for following in real-time the process of post-heat and melting of PET coating during production of metal-polymer laminate. The data of in-line quality control monitoring are consistent with data of off-line thermal, optical and sterilisation performance investigations.

TABLE 4

Off-line characterisation and in-line near infra-red characterisation data

| | Reference sample | Test sample 1 | Test sample 2 | Test sample 3 | Test sample 4 |
|---|---|---|---|---|---|
| Film type | PET | PET | PET | PET | PET |
| T2 (° C.) | 270 | 200 | 220 | 240 | 260 |
| CI | 0 | 4.966 | 0.056 | 0.001 | 0.02 |
| X (wt. %) | 4.8 | 36.2 | 4.0 | 1.9 | 5.4 |
| Gitterschnitt | 1 | 2 | 1 | 1 | 1 |

Figure 4:
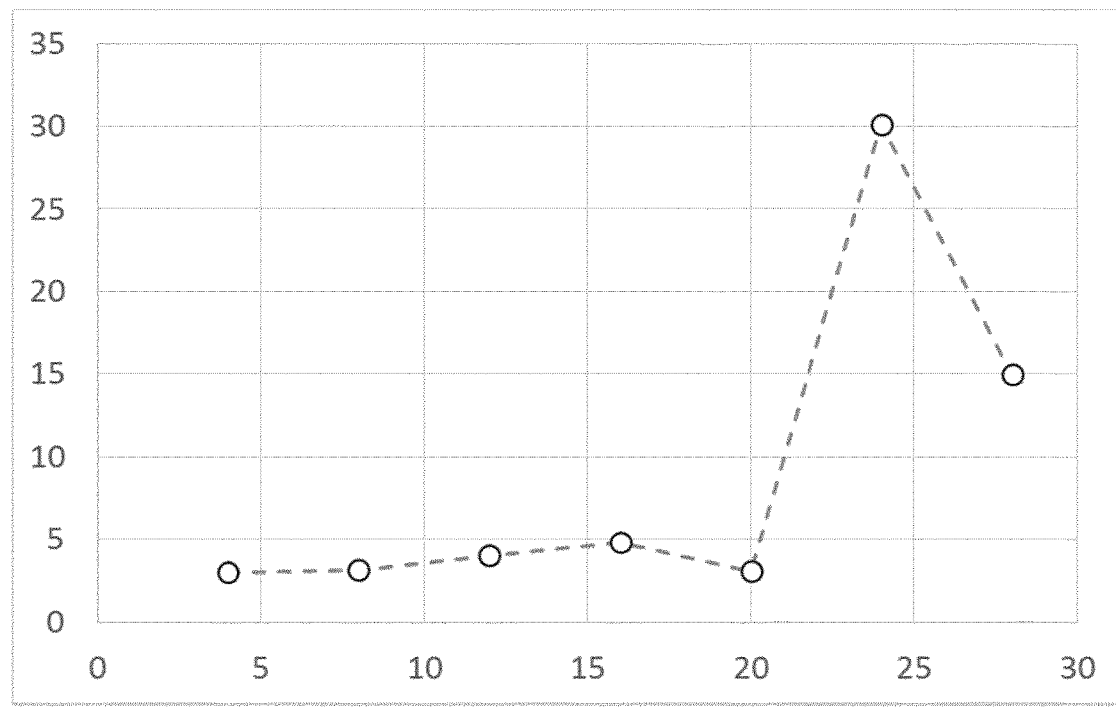
FIG. 4 shows the crystallinity as determined by DSC (in wt. %) as a function of the width of the strip (in arbitrary units).

FIG. 4 shows the importance of both the homogeneity of the post-heat temperature and the ability to measure the crystallinity over the width of the strip. In this figure a higher value of crystallinity (as determined afterwards with DSC) of over 30% is detected near the edge of the strip. The ability to measure the NIR-spectrum over the width of the strip would enable mitigation of this deviation in-line by increasing the post-heat set-point thereby securing that the degree of crystallinity drops below the target value.

Figure 5:
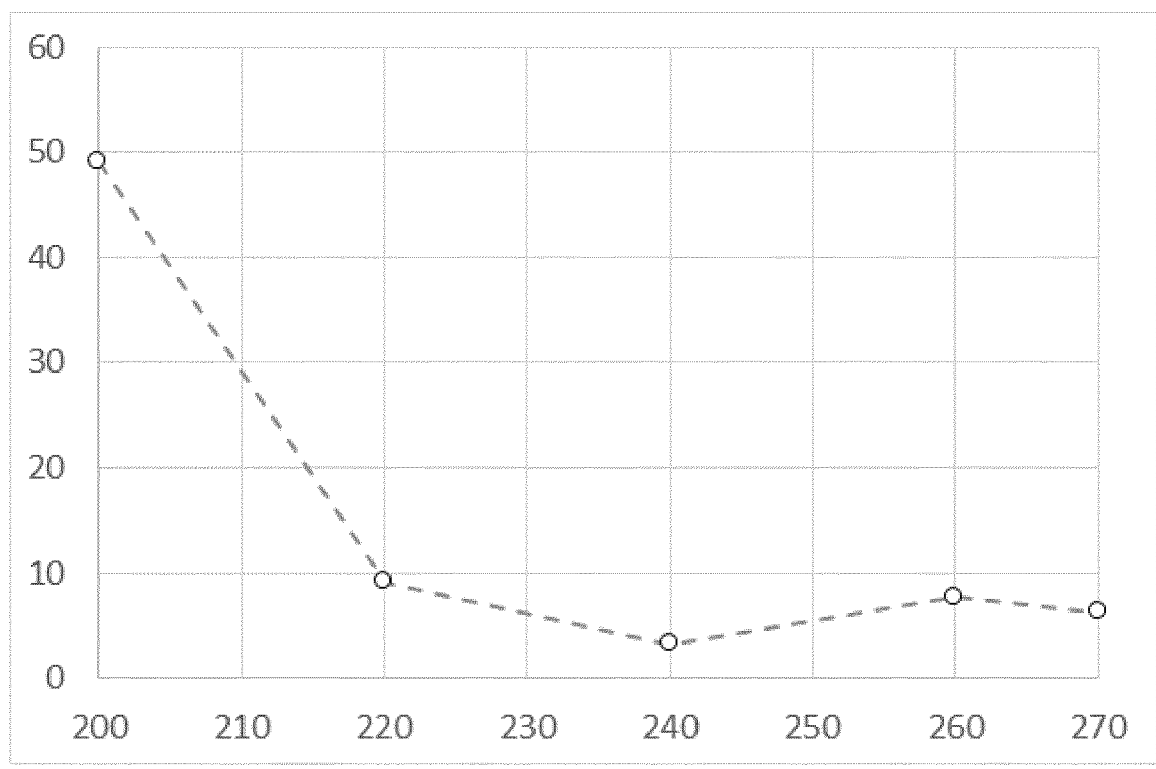
FIG. 5 shows the crystallinity (in wt. %) as a function of the post-heat set-point T2 (° C.).

FIG. 5 also shows the relation between the post-heat set-point T2 and the degree of crystallinity. By measuring the NIR spectra at a plurality of positions over the width, or by using a scanning NIR spectrometer the reliability of the method can be further improved, and situations like the one presented in FIG. 4 can be prevented or mitigated.

The invention claimed is:

1. A method for producing a polymer coated metal strip in a continuous coating line, the method comprising the subsequent steps of:
   providing a metal strip;
   providing a thermoplastic polymer film for coating onto at least one side of the metal strip;
   laminating the thermoplastic polymer film onto the metal strip to produce a polymer coated metal strip;
   post-heating the polymer coated metal strip to a temperature sufficiently high to melt the thermoplastic polymer film in order to reduce the orientation and crystallinity of the thermoplastic polymer film to the target value;
   cooling the post-heated polymer coated metal strip;
   in-line illuminating the laminated polymer film with near-infrared light having one, more or all wavenumbers between 3500 and 9000 cm$^{-1}$;
   in-line acquiring back-scattered near-infrared light with a near-infrared spectroscopy detector;

calculating a near-infrared spectrum from the back-scattered near-infrared light;

determining the degree of crystallinity and/or the molecular orientation of the laminated polymer film by comparing the calculated near-infrared spectrum to a near-infrared spectrum of a reference material to determine a Conformity Index as a measure of the degree of crystallinity and/or the molecular orientation of the laminated polymer film.

2. The method according to claim 1, wherein a polymer film is laminated onto both sides of the metal strip, and wherein the degree of crystallinity and/or the molecular orientation of both laminated polymer films is determined on both sides of the metal strip.

3. The method according to claim 1, wherein the wavenumber of the infra-red light is between 3750 and 6000 $cm^{-1}$.

4. The method according to claim 1, wherein the measured CI is lower than 0.5.

5. The method according claim 1, wherein one or both of the post-heat set-point (T2) and the line speed of the continuous coating line is adjusted if the conformity index that is calculated on the basis of the back-scattered NIR-light is above 0.5.

6. The method according to claim 1, wherein a plurality of near-infrared spectroscopy detectors is used to acquire back-scattered near-infrared light over the width of the strip, or wherein one or more scanning near-infrared spectroscopy detector(s) is (are) used to acquire back-scattered near-infrared light over the width of the strip.

7. The method according to claim 1, wherein the metal strip is a steel strip.

8. The method according to claim 7, wherein the steel strip is uncoated cold-rolled steel strip, tinplate, ECCS, TCCT, galvanised steel or aluminised steel strip.

9. The method according to claim 1, wherein the thermoplastic polymer film is a single layer or multilayer polyester or polyolefin polymer film.

10. The method according to claim 1, wherein the thermoplastic polymer film for coating onto the metal strip consists of two or more layers and is produced by:
melting thermoplastic polymer granules in two or more extruders to form the two or more layers;
forming the thermoplastic polymer film consisting of the two or more layers by passing the molten polymer or polymers through a flat co-extrusion die and/or two or more calendering rolls;
optionally followed by:
cooling the thermoplastic polymer film to form a solid thermoplastic polymer film;
optionally trimming the edges of the thermoplastic polymer film;
reducing the thickness of the solid thermoplastic polymer film by stretching the solid polymer film in a stretching unit by exerting a stretching force only in the longitudinal direction;
optionally trimming the edges of the stretched thermoplastic polymer film.

11. The method according to claim 1, wherein the thermoplastic polymer film is biaxially oriented polymer film.

12. The method according to claim 1, wherein the one or more thermoplastic polymer film is uniaxially oriented polymer film.

13. The method according to claim 1, wherein the target value for the crystallinity of the laminated polymer film is at most 10 wt. %.

14. The method according to claim 1, wherein the wavenumber of the infra-red light is at least 4100 cm−1.

15. The method according to claim 1, wherein the wavenumber of the infra-red light is at most 4500 cm−1.

16. The method according to claim 1, wherein the thermoplastic polymer film for coating onto the metal strip consists of one layer and is produced by:
melting thermoplastic polymer granules in one extruder to form the one layer;
forming the thermoplastic polymer film consisting of the one layer by passing the molten polymer or polymers through a flat extrusion die and/or two or more calendering rolls;
optionally followed by:
cooling the thermoplastic polymer film to form a solid thermoplastic polymer film;
optionally trimming the edges of the thermoplastic polymer film;
reducing the thickness of the solid thermoplastic polymer film by stretching the solid polymer film in a stretching unit by exerting a stretching force only in the longitudinal direction;
optionally trimming the edges of the stretched thermoplastic polymer film.

17. A method for producing a polymer coated metal strip in a continuous coating line, the method comprising the subsequent steps of:
providing a metal strip;
providing one or more thermoplastic polymer films for coating onto at least one side of the metal strip;
laminating the one or more thermoplastic polymer films onto the metal strip to produce a polymer coated metal strip;
post-heating the polymer coated metal strip to a temperature sufficiently high to melt the one or more thermoplastic polymer films in order to reduce the orientation and crystallinity of the one or more thermoplastic polymer films to the target value;
cooling the post-heated polymer coated metal strip;
in-line illuminating the one or more laminated polymer films with near-infrared light having one, more or all wavenumbers between 3500 and 9000 $cm^{-1}$;
in-line acquiring back-scattered near-infrared light with a near-infrared spectroscopy detector;
calculating a near-infrared spectrum from the back-scattered near-infrared light;
determining the degree of crystallinity and/or the molecular orientation of the one or more thermoplastic polymer films by comparing the calculated near-infrared spectrum to a near-infrared spectrum of a reference material to determine a Conformity Index as a measure of the degree of crystallinity and/or the molecular orientation of the one or more thermoplastic polymer films.

18. The method according to claim 17, wherein the one or more thermoplastic polymer films are biaxially oriented polymer films.

19. The method according to claim 17, wherein the one or more thermoplastic polymer films are uniaxially oriented polymer films.

* * * * *